(12) United States Patent
Ould Bougrissa

(10) Patent No.: US 7,964,270 B2
(45) Date of Patent: Jun. 21, 2011

(54) FLEXIBLE DECORATIVE LAMINATE

(75) Inventor: Gilbert Ould Bougrissa, Bergerac (FR)

(73) Assignee: Illinois Tool Works Inc., Glenview, IL (US)

( * ) Notice: Subject to any disclaimer, the term of this patent is extended or adjusted under 35 U.S.C. 154(b) by 6 days.

(21) Appl. No.: 12/083,889

(22) PCT Filed: Oct. 26, 2006

(86) PCT No.: PCT/FR2006/051107
§ 371 (c)(1),
(2), (4) Date: Nov. 18, 2008

(87) PCT Pub. No.: WO2007/048977
PCT Pub. Date: May 3, 2007

(65) Prior Publication Data
US 2009/0075039 A1    Mar. 19, 2009

(30) Foreign Application Priority Data
Oct. 27, 2005    (FR) ...................................... 05 10972

(51) Int. Cl.
*B32B 17/04*    (2006.01)
*B32B 38/08*    (2006.01)
(52) U.S. Cl. ..................... 428/195.1; 428/203; 428/210; 156/60
(58) Field of Classification Search ............... 428/195.1, 428/203, 210; 156/60
See application file for complete search history.

(56) References Cited

U.S. PATENT DOCUMENTS

| 3,113,888 | A | * | 12/1963 | Gold et al. | 428/463 |
| 3,616,021 | A | * | 10/1971 | Valerius | 156/247 |
| 3,887,743 | A | * | 6/1975 | Lane | 428/206 |
| 3,928,706 | A | * | 12/1975 | Gibbons | 428/323 |
| 4,435,234 | A | * | 3/1984 | Hunt | 156/62.4 |
| 6,034,181 | A | * | 3/2000 | Bazaj et al. | 525/218 |
| 2006/0062955 | A1 | | 3/2006 | Liu et al. | |

FOREIGN PATENT DOCUMENTS

| EP | 0 322 287 A | 6/1989 |
| EP | 0 545 741 A | 6/1993 |
| FR | 1 528 741 A | 6/1968 |
| FR | 2 095 214 A | 2/1972 |
| FR | 2 267 206 | 11/1975 |
| FR | 2 461 061 A | 1/1981 |
| FR | 2 505 908 A1 | 11/1982 |
| FR | 2 511 717 A | 2/1983 |
| FR | 2 530 274 A | 1/1984 |
| FR | 2 530 274 A1 | 1/1984 |
| FR | 2530274 | * | 1/1984 |
| WO | WO 2005/016663 | 2/2005 |

OTHER PUBLICATIONS

Co-Pending U.S. Appl. No. 11/272,991, filed Nov. 14, 2005.

* cited by examiner

*Primary Examiner* — Betelhem Shewareged
*Assistant Examiner* — Sathavaram I Reddy
(74) *Attorney, Agent, or Firm* — Pauley Petersen & Erickson

(57) ABSTRACT

A flexible decorative laminate including a core obtained by impregnating a carrier with a thermosetting resin associated with a decorative layer and provided with a protective layer. The carrier includes cellulose and glass fibers which are bound to each other by a plasticizer.

16 Claims, 1 Drawing Sheet

FLEXIBLE DECORATIVE LAMINATE

FIELD OF THE INVENTION

The present invention relates to the technical field of laminates. The invention particularly relates to a decorative laminate, to a process for the preparation of such a laminate and to the uses of such a laminate, particularly in the construction and furnishing sector.

BACKGROUND OF THE INVENTION

In order to improve the surface appearance of panels most often based on wood, it is conventional to use so-called laminated or high performance laminated boards or sheets as a function of the setting, called decorative laminates. In a known manner, such decorative laminates are present in the form of a board which generally has a part called the core, formed by an assembly of superposed layers or sheets made out of cellulose fiber material, and most often out of kraft paper, joined on one of its large surfaces with a decorative layer, most often in the form of a decorated paper. The layer(s) constituting the decorative layer(s) has (have) colors or decorative patterns, and is (are) impregnated with melamine resins and/or is (are) covered with a surface covering impregnated with phenolic resins. The different elements constituting these decorative laminates are connected together by a so-called "high pressure" process which is described below. The opposite side of the board from the decorative layer is most often capable of being glued on a support.

It is common to put a surface covering on the decorative paper, ensuring its protection. This surface covering most often consists of a so-called "overlay" sheet of paper made of alpha cellulose fibers impregnated with a thermosetting melamine-formaldehyde resin making it possible to produce a transparent protective covering after thermocompression.

Such decorative laminates are described, for example, in the documents U.S. Pat. No. 3,616,021 or FR 2 267 206 in the name of the Formica company, which can be referred to for more details.

These types of decorative laminates are rather rigid and cannot be shaped at room temperature. Such laminates are prepared according to a discontinuous pressing process at high pressure and generally have a thickness between 0.5 and 1 mm. The high pressure process consists of the simultaneous application of heat (temperature $\geq 120°$ C.) and a determined high pressure ($\geq 5$ MPa), in order to allow flow, and then polycondensation of the thermosetting resins so as to obtain a non-porous homogeneous material (with a density $\geq 1.35$ g/cm$^3$), whose surface has the required appearance.

Another line of decorative laminates, in this case prepared according to a continuous pressing process at a lower pressure, has been developed. The decorative laminates obtained by such a process are thinner (most often with a thickness of 0.25-0.6 mm) and more flexible, but their surface resistance, particularly with regard to external stresses and chemical products, has poorer performance.

SUMMARY OF THE INVENTION

In this context, the present invention proposes to provide much more flexible decorative laminates which can be worked at room temperature, in particular for the execution of veneering on curved shapes.

Another objective of the invention is to provide a decorative laminate which can be produced according to an easy, low-cost process, and which is easy to machine.

Another objective of the invention is to propose decorative laminates which have improved dimensional stability, particularly in case of temperature change or in case of change of humidity conditions. The decorative laminates according to the invention must be capable of being used not only on carriers conventionally based on wood but in an innovative manner on plaster or metal supports.

The present invention therefore provides a flexible decorative laminate which has a core obtained by impregnation of a carrier with a thermosetting resin, joined with a decorative layer, possibly covered with a protective covering, characterized by the fact that the carrier contains cellulose fibers and glass fibers connected together by a plasticizer.

The decorative laminate according to the invention preferably has one or another of the characteristics below, or any combination of these characteristics when they do not exclude one another:
- the core is a single layer,
- the thermosetting resin is a phenolic resin, preferably a phenol/formaldehyde mixture, obtained in a basic reaction medium.
- the weight of resin advantageously represents 34-40% and preferably 36-38% of the total weight of the impregnated core.
- the glass fibers have a length greater than or equal to 4 mm,
- the glass fibers represent 10-20% and preferably 16-17% of the total weight of the support,
- the cellulose fibers are bleached, raw or recycled cellulose fibers, possibly in the form of a mixture,
- the cellulose fibers represent at least 60% and preferably at least 67% of the total weight of the support,
- the plasticizer is starch,
- the plasticizer represents 10-20% and preferably 14-16% of the total weight of the support,
- the decorative laminate has a thickness between 0.2 and 0.4 mm, and advantageously is on the order of 0.3 mm,
- its specific gravity is preferably greater than or equal to 1.35,
- its combustion releases a calorific potential of less than 4.5 MJ/m$^2$
- it can be shaped at room temperature (that is to say at a temperature between 18 and 25° C.) to radii of curvature of 11 mm and more, and by heating to a temperature greater than or equal to 80° C., to radii of curvature of 2.8 and more,
- its thermal expansion, over a temperature range of 20-100° C., is between 0 and 500 ppm ($10^{-6}$ meter).

The present invention also provides a process for preparation of a decorative laminate as defined above, in which a core is prepared by impregnation with a thermosetting resin of a carrier containing cellulose fibers and glass fibers connected together by a plasticizer, and a stack of the impregnated core that is obtained and of a decorative layer, possibly covered with a protective covering, is assembled under pressure.

Advantageously, assembly takes place at a temperature between 115 and 195° C. Preferably, the applied pressure is between 2 and 10 MPa.

The present invention also relates to the use of a decorative laminate as defined above as covering material for a support made of wood, plaster, concrete, cellular concrete or metal.

BRIEF DESCRIPTION OF THE DRAWINGS

The following description in reference to the appended drawings enables one to better understand the invention.

DETAILED DESCRIPTION OF THE DRAWINGS

Figure 1:
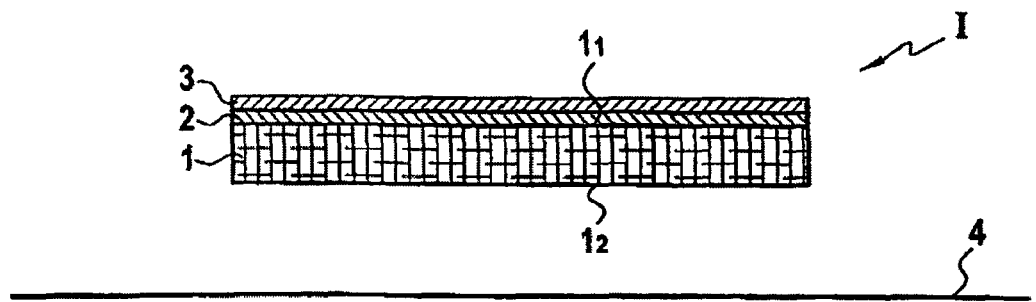
FIG. 1 shows a diagrammatic view in section of the different constituents of a laminate according to the invention.

In a conventional manner, decorative laminates I according to the invention are composed of core 1, decorative layer 2, most often covered with protective covering 3, as illustrated by FIG. 1.

The originality of the decorative laminates according to the invention is directly connected to core 1 and the materials from which it is constituted. This core 1 has a constitution which is atypical for a decorative laminate. It contains not only cellulose fibers but also glass fibers and a plasticizer, most often in the form of an organic polymer. The glass fibers preferably have a length greater than or equal to 4 mm. Their proportion advantageously represents 10-20% and preferably 16-17% of the total weight of the support. These glass fibers give the novel laminate obtained its rigidity and stability.

These glass fibers are mixed with cellulose fibers, which can be of different grades, bleached, raw or recycled in particular, possibly in the form of a mixture. The proportion of these fibers in the carrier advantageously represents at least 60% and preferably at least 67% of the total weight of the impregnation carrier. The presence of the glass fibers makes it possible to obtain good dimensional stability of the laminate and gives it suitable rigidity.

In order to connect these fibers and to plasticize the carrier, a plasticizer is used. Advantageously, the plasticizer represents 10-20% and preferably 14-16% of the total weight of the core before impregnation. Preferably, this plasticizer is a plant starch. Other plasticizers can be used, such as polyvinyl alcohol, sugar, acetoguanamine (6-methyl 1,3,5-triazine-2,4-diyldiamine), caprolactam, or thioureas. This plasticizer contributes to the flexibility characteristics of the decorative laminate which is obtained. But above all, the plasticizer makes it possible to improve the thermal expansion behavior of the laminate in a temperature range on the order of 20-100° C. The decorative laminate according to the invention has advantageous plastic properties. The presence of this plasticizer also influences the mechanical strength characteristics, such as the rigidity and rupture stress of core 1 and of decorative laminate I obtained with such a core 1. Furthermore, the impregnation carrier preferably has a grammage of 100-150 g/m² and preferably on the order of 130 g/m².

Also, according to an advantageous variant, the total weight of the glass fibers, cellulose fibers and plasticizer represents at least 98% of the total weight of the impregnation carrier. The remaining 2% maximum can correspond, for example, to retention agents or flocculants which are conventionally present in sheets of paper.

Core 1 is obtained by impregnation of an impregnation carrier as defined above with a thermosetting resin. The impregnation carrier is present in the form of a sheet whose characteristics of porosity or permeability with regard to air are advantageously chosen so as to enable the thermosetting resin and particularly the phenolic resin to penetrate into the whole thickness of the carrier and to impregnate it. The values of porosity or resistance to air penetration of the impregnation carrier according to the Gurley test (AFNOR standard NFQ 03-061) are preferably 1-15 sec, with 3-6 sec being preferred. Suitable impregnation by the phenolic resin to the heart of the carrier in particular makes it possible to ensure the characteristics required by the decorative laminate standards EN438-1 & 2.

In particular, the thermosetting resin which is used gives obtained decorative laminates I mechanical strength characteristics, according to the different mechanical stresses to which they are subjected. The impregnation resin for core 1 is preferably a thermosetting phenolic resin, preferably a phenol/formaldehyde mixture, obtained in a basic reaction medium. This resin also contributes to the possible shaping of the finished laminate.

Advantageously, the impregnation of the carrier is performed with a mixture of formaldehyde and phenol which has one or more of the characteristics below:
- a viscosity of 0-100 mPA/s and preferably 30-35 mPA/s; measurement of the viscosity is performed at 25° C. using a Brookfield apparatus,
- the pH at 20° C. of the resin is 7.0-12 and preferably 7-8,
- the quantity of dry material present in the resin is in the range of 35-65% and preferably 50-55%; the measurement is performed using an apparatus making possible simultaneous heating and weighing of the weight loss, and thus the determination of the loss of volatile materials during the heating time. The heating is performed at 180° C. until stabilization of the weight loss.

The impregnation of the support is carried out, for example, by dipping the impregnation support in sheet form in a bath of thermosetting resin. Coming out of the bath, the support is thus impregnated to the core with the thermosetting resin. The quantity of resin which impregnates the support can be adjusted according to any technique well known to the expert in the field, for example, by calibrating or metering.

The percentage of impregnation of the core with the thermosetting resin is such that the weight of resin advantageously represents 34-40% and preferably 36-38% of the total weight of the impregnated core on the laminate which is obtained (that is to say after elimination of the volatile substances present in the impregnation bath, elimination which takes place during the thermocompression step). The impregnated core, before laminating, generally contains a weight percentage of 6-8% of volatile substances (weight of volatile substances/weight of the impregnated core ×100) and preferably 6.5-7.5%. These volatile substances are eliminated during the later laminating step. These volatile substances come particularly from the solvents contained in the impregnation resin, which are generally water and/or an alcohol.

Core 1 is joined on its large surface $1_1$ with decorative layer 2. The decoration can be a solid color or can correspond to a pattern or design. Any type of decorative layer used in the prior art can be used. It will be possible to use, for example, plain paper, paper carrying an added decoration, etc. It is also possible for the decorative layer to include a number of sheets, for example, with a plain sheet functioning as screen in order to make the decoration opaque. This decorative layer can be impregnated with a thermosetting resin, advantageously with a melamine resin. The printed paper is produced, for example, by photogravure, and its grammage is preferably between 65 and 100 g/m².

The decorative layer can be covered with a surface covering. This is the case in particular when it is not impregnated with a thermosetting resin; it is then the surface covering that provides the protection. The surface covering can be a paper with a low grammage, called an "overlay," or directly a layer of transparent thermosetting resin of the melamine type. An "overlay" paper is generally made of alpha cellulose fibers impregnated with a thermosetting melamine-formaldehyde resin. Such a paper preferably has a grammage of 14-50 g/m² and makes it possible to provide the laminate surface with the quantity of melamine resin sufficient to obtain the desired resistance characteristics in accordance with the EN438 standard. Furthermore, the "overlay" is a transparent layer, and makes it possible to obtain very good reflection of the print of the decoration present on the decorative sheet.

The support impregnated with thermosetting resin and the decorative layer, possibly covered with a surface covering, are stacked and joined by thermocompression. During this laminating step, one obtains cross-linking of the thermosetting resin and bonding between obtained core 1 and the decorative layer, this bonding being brought about by the thermosetting resin.

Structurally, decorative laminate I according to the invention is therefore differentiated by the nature of the core, which is no longer made up of a number of sheets of kraft paper, but rather of a core of special paper based on cellulose fibers, glass fibers and plasticizer. This core advantageously consists of a single sheet. The decorative laminate according to the present invention preferably has a thickness between 0.2 and 0.4 mm, and advantageously on the order of 0.3 mm. Its specific gravity is preferably greater than or equal to 1.35.

The decorative laminates according to the invention can be prepared by laminating under high pressure. In a general manner, their process of preparation takes place in four steps:
1. impregnation
2. stacking
3. laminating
4. finishing The impregnation consists of introducing the corresponding resin into the different layers which need to be impregnated, namely the support constituting the core, the decorative layer and the overlay covering.

The impregnator is made up of a head called a reel making it possible to unwind the rolls of paper, an impregnation head which has a holding tank for the resin and a system making it possible to quantify the amount of resin that one wishes to introduce per $m^2$, a dryer which eliminates the quantity of solvent contributed by the resin, and a system which puts the impregnated support in the form of sheets or rolls.

The stacking consists of superposing the different elements constituting the laminate: the impregnated support (corresponding to core 1), then decorative layer 2 and covering 3, in such a way that the decorative layer is positioned between core 1 and covering 3.

The laminating makes it possible to assemble the different layers and is performed by thermocompression, most often in a press. The laminating is advantageously carried out at a temperature of 115-195° C. The applied pressure is preferably between 2 and 10 MPa.

Figure 2:
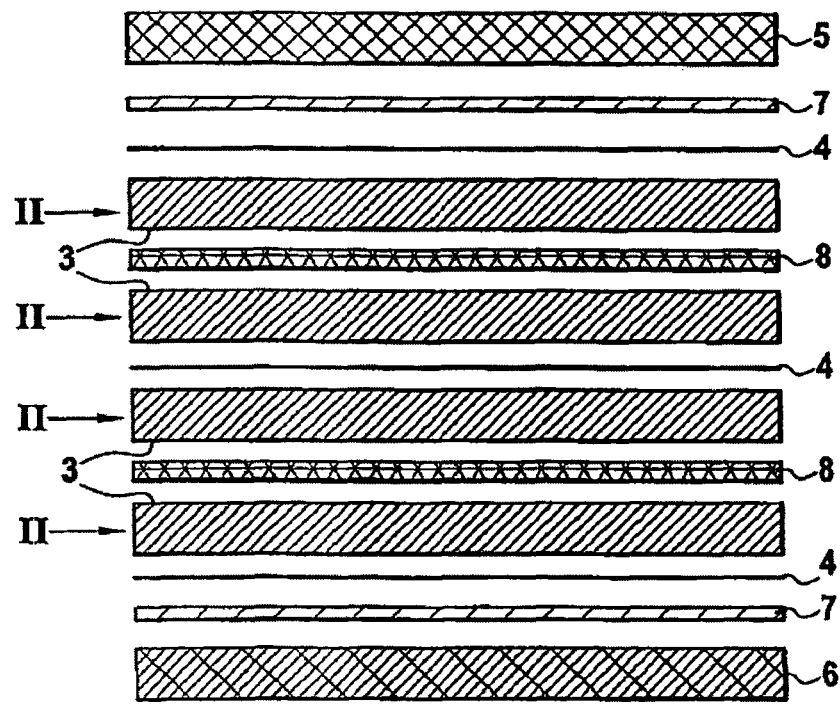
FIG. 2 shows a diagrammatic view in section of a device making it possible to prepare a number of decorative laminates at the same time.

A number of laminates can be manufactured simultaneously. The stacks are in that case arranged symmetrically with respect to separation sheet 4. Surface $1_2$ of core 1, on the side opposite the decorative side, of each stack faces the separation sheet, as illustrated by FIG. 2. Panels or metal sheets, for example, made of stainless steel, textured or not, can be positioned facing decorative surface 2 so that each "overlay" 3 is in contact with a metal sheet. These metal sheets give the laminate a surface condition that can be shiny or textured.

A finishing step consisting of an operation of cutting the edges of the obtained laminate is most often carried out in order to put the decorative laminate in the final format.

The decorative laminates according to the invention are preferably obtained by high-pressure pressing, but their mechanical characteristics differ from the high-pressure laminates (HPL) and continuously-pressed laminates (CPL) found on the market.

The decorative laminates according to the invention have the following advantages:

they have a grade of M1, that is to say that they nonflammable, they have a much lower heat-generating capacity than the laminates of prior art. Advantageously, a decorative laminate according to the invention releases, by combustion, a calorific potential of less than 4.5 $MJ/m^2$, measured according to the method ISO5660, they are very easy to work and to machine; they can be cut with conventional tools such as a razor knife or chisel, they have the same surface resistance as the high-pressure laminates, they can be worked at room temperature, given their great flexibility and their small thickness. It is possible to shape the decorative laminates according to the invention at room temperature to radii of curvature of 11 mm and more, and by heating at a temperature greater than or equal to 80° C., to radii of curvature of 2.8 and more.

The decorative laminates according to the invention can be used as covering material for various supports based on wood, but also made of gypsum board, plaster, cellular concrete (Siporex), metal, etc. The decorative laminates according to the invention have a thermal expansion in the lengthwise and transverse directions that is superior to that of the laminates of the prior art. Advantageously, their thermal expansion, measured according to the standards ISO 11359-2: October 1999 Plastics—thermomechanical analysis (TMA)—part 2: determination of the linear coefficient of thermal expansion and of the glass transition temperature, and ISO 11359-1: 1999 October 1999 Plastics—thermomechanical analysis (TMA)—part 1: general principles, in a temperature range of 20-100° C., is between 0 and 500 ppm ($10^{-6}$ meter).

These decorative laminates allow a wide range of uses for fitting out and decoration of buildings, and particularly for the execution of partitions, doors, and kitchen, bathroom, office furnishings. The decorative laminates of the invention can in particular be used in construction of very high buildings and of public establishments, thanks to their fire-behavior performance.

An embodiment example of a decorative laminate according to the invention is given in the following for illustration.

EXAMPLE

A 130 $g/m^2$ sheet of paper (SISD130 from Cascades, Sainte Marie, France), intended for constituting the core of the laminate, is used. This sheet of paper is composed of 68 wt % bleached cellulose fibers, 14 wt % starch and 17 wt % glass fibers with a minimum length of 4 mm. This sheet of paper is impregnated with phenolic resin in such a way that after impregnation, the weight of resin corresponds to 36-38% of the total weight of the impregnated paper. The total weight of the impregnated paper includes 6.7-7.5% volatile substances.

The phenolic resin used is prepared in the following way: the molar ratio of formaldehyde to phenol used is 1.35, and caustic potash lye is also used in a molar proportion to the phenol of 0.045.

For this, an aqueous solution of formaldehyde at a concentration of 50 wt %, an aqueous solution of phenol at a concentration of 99.9 wt % reduced to 92% by the addition of water, and caustic potash lye at a concentration of 50 wt % are used.

Introduction of the phenol and the caustic potash lye is performed by adding in a reactor, with the temperature maintained below than 55° C. Then the formaldehyde is gradually introduced (introduction lasting on the order of 60 min), with the temperature of the reaction medium maintained below than 65° C.

Then the temperature of the reaction mixture is maintained at 93±0.5° C. for approximately 55 minutes, and continuous cooling is then effected by means of a reactor equipped with a double shell, in which lower-temperature water at about 15° C. circulates. When the temperature of 50° C. is reached, hydrochloric acid (21 wt %) is added to lower the pH at 20° C. to a value of 7.3±0.1, and simultaneously, dilution with methanol is performed to lower the dryness of the resol to a value of 52±1%.

A lightweight and translucent 24 g/m² sheet of paper of stationery material (TVONA 25 from Schoeller) is also used, which is impregnated with melamine resin in such a way that after impregnation, the weight of resin corresponds to 76-78% of the total weight of the impregnated paper. The total weight of the impregnated paper includes 7-8% volatile substances. This sheet of paper is commonly called: overlay.

The melamine resin used is prepared in the following way: one uses a molar ratio of formaldehyde to melamine of 1.65 and a proportion of water of 2.58 mol %.

One introduces into a reactor, provided with a stirrer and equipped with a double shell, formaldehyde (Casconobel, aqueous solution at a concentration of 50 wt % which is reduced to 42% by the addition of water) and polyvinyl alcohol, diluted to 3.2±0.1% beforehand in softened water, in a proportion of 0.66 wt % with respect to the weight of melamine. Soda at a concentration of 20 wt % is then added to adjust the pH at 20° C. to a value of 9.2±0.1. Then the total quantity of melamine is introduced, and the reaction mixture is heated very quickly to 95±1° C. and maintained until obtaining a dilutability in terms of volume of 1.6±0.1 with respect to a volume of resin removed from the reactor and brought to 20° C. This dilutability is determined by the removal of 30 mL of resin brought to a temperature of 20° C. to which 48 mL of water at 20° C. are added. When cloudiness is obtained, the temperature is lowered. When the reaction mixture reaches 55° C., one adds:

magnesium sulfamate, an accelerator for melamine resin, in a proportion of 0.56% with respect to the weight of the resin, MSP 523 B (Münch), a parting agent for melamine resin, in a proportion of 0.2% with respect to the weight of the resin, N 7 (Münch), a wetting agent for melamine resin, in a proportion of 15% with respect to the weight of the resin, diethylene glycol in a proportion of 4.7% with respect to the weight of the resin.

The melamine resin obtained has the following characteristics:
a Brookfield viscosity at 20° C. of 37±3 mPAS
a percentage of dry materials at 180° C. of 50±1 wt %
a pH at 20° C. which must be 9.2±0.2

The steps for impregnation of the papers either with phenolic resin or with melamine resin are carried out by dipping in the bath of phenolic or melamine resin; then the quantity of resin is adjusted by calibrating rolls, and the impregnated paper is dried in a drying machine with blown hot air. Finally, the sheet obtained is cooled using a chill roll and formatted using a rotary cutter.

The parameters of the impregnator used are the following:
Temperature of the resin bath: 35±2° C.
Temperature of the zones of the drying machine: 5 successive zones are at 120° C., 140° C., 160° C., 140° C. and 120° C.

The decorative laminate is then produced manually by stacking the sheets below according to the desired format and in the order below, as illustrated by FIG. 1:

surface covering 3, corresponding to the overlay sheet, impregnated with melamine resin, decorated paper 2, core 1 (or more precisely the support impregnated with phenolic resin), corresponding to the sheet of paper impregnated with phenolic resin, separating sheet 4 made of 40-microns propylene.

Surface covering 3, decorated paper 2 and core 1 constitute stack II.

The laminating is then effected by thermal conduction obtained using metallic plates 5 and 6 which are perforated to allow the passage of a coil of super-heated water, these two plates functioning as a press. The laminate curing cycle then takes place by heating to a maximum temperature below 130° C.; then the laminate is cooled to 65° C. This thermal cycle takes place under isobaric conditions of 6-8 MPa, or even 4-5 MPa.

In particular, the following curing cycle is used:
a) Rise to the so-called holding temperature of 110° C. of the panel situated in the middle of the stage
b) Maximum temperature of the interior panel: 128-130° C.
c) Duration of holding at 110° C. is 16 min ±2°
d) Cooling to 60° C. at the interior panel.

Once the laminating is finished, separating sheet 4 is removed.

The next step is finishing, which consists of eliminating the flashes on each side of the laminate. This is performed using a saw, blade or shaper. There is no step of sanding the laminate on surface 12 of core 1 on the side opposite decorative layer 2.

FIG. 2 illustrates a stack in a press between two plates 5 and 6 enabling a number of laminates I to be produced simultaneously, making it possible to improve productivity. Cushion sheets 7 are used to partially limit laminating defects. Stainless steel sheets 8, textured or not, are positioned facing the decorated surface, so that each overlay is in contact with a metal sheet. In the lower part of the press, a metal support sheet can be inserted between plate 6 and cushion 7 thus assuring the movement of the various elements from top to bottom.

The invention claimed is:

1. A flexible decorative laminate (I) comprising:
a core (1) consisting of a support impregnated with a thermosetting resin; and a decorative layer (2) joined with the core (1);
wherein the support consists essentially of at least about 60% by weight cellulose fibers and 10-20% by weight glass fibers connected together by about 10-20% by weight of a plasticizer.

2. The decorative laminate (I) according to claim 1, wherein the thermosetting resin comprises a phenolic resin, or a phenol/formaldehyde mixture obtained in a basic reaction medium.

3. The decorative laminate (I) according to claim 2, wherein a weight of the thermosetting resin is 34-40% of the total weight of the impregnated core.

4. The decorative laminate (I) according to claim 1, wherein the support has a grammage of 100-150 g/m².

5. The decorative laminate (I) according to claim 1, wherein the total weight of the glass fibers, cellulose fibers and plasticizer is at least 98% of the total weight of the support.

6. The decorative laminate (I) according to claim 1, wherein combustion of the laminate releases a calorific potential of less than 4.5 MJ/m².

7. The decorative laminate (I) according to claim 1, wherein at room temperature the decorative laminate can be shaped to radii of curvature of 11 mm or less, and by heating to a temperature greater than or equal to 80° C., to radii of curvature of 2.8 mm or less.

8. The decorative laminate (I) according to claim 1, wherein thermal expansion of the laminate, over a temperature range of 20-100° C., is between 0 and 500 ppm ($10^{-6}$ meter).

9. The decorative laminate (I) according to claim 1, wherein the laminate has a thickness between 0.2 and 0.4 mm.

10. The decorative laminate (I) according to claim 1, wherein the core (1) is a single layer.

11. The decorative laminate (I) according to claim 1, wherein the glass fibers have a length greater than or equal to 4 mm.

12. The decorative laminate (I) according to claim 1, wherein the cellulose fibers are bleached, raw or recycled cellulose fibers, or a mixture thereof.

13. The decorative laminate (I) according to claim 1, wherein the plasticizer is starch.

14. The decorative laminate (I) according to claim 1, wherein the decorative laminate has a specific gravity of greater than or equal to 1.35.

15. A flexible decorative laminate (I) comprising:
a core (1) consisting of a support impregnated with a thermosetting resin, wherein the support consists essentially of at least about 60% by weight cellulose fibers and 10-20% by weight glass fibers connected together by about 10-20% by weight of a plasticizer
a decorative layer (2) joined with the core (1); and
a protective covering (3) covering the decorative layer.

16. A flexible decorative laminate (I) comprising:
a core (1) consisting of a support impregnated with a thermosetting resin, wherein the support consists essentially of at least about 60% by weight cellulose fibers and glass fibers connected together by about 10-20% by weight of a plasticizer, the glass fibers have a length greater than or equal to 4 mm, and an amount of the glass fibers is 10-20% of the total weight of the support; and
a decorative layer (2) joined with the core (1); and
a protective covering (3) covering the decorative layer.

* * * * *